June 6, 1961  A. J. HAMMOND  2,986,770
TORSION ROD HINGE
Filed May 19, 1960  3 Sheets-Sheet 1
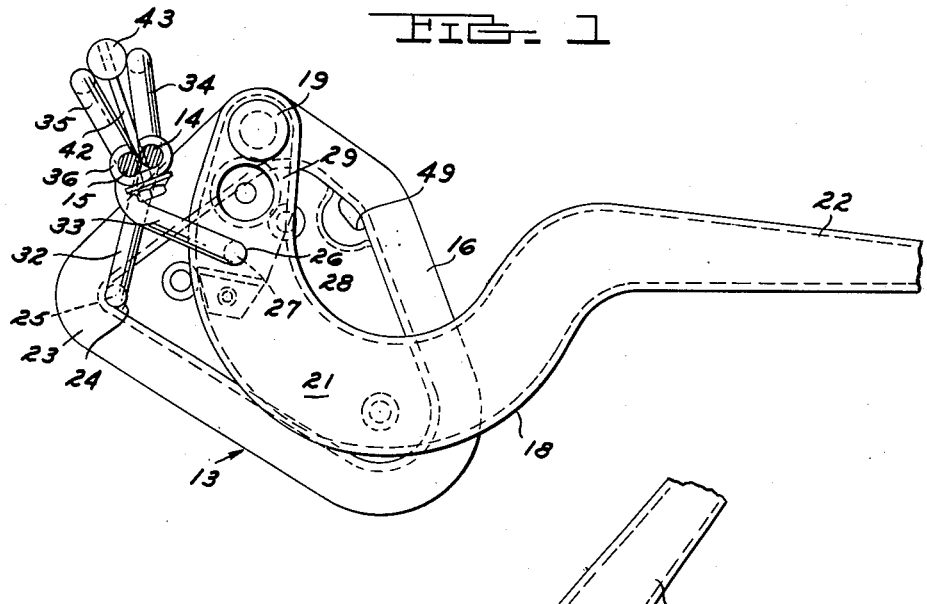
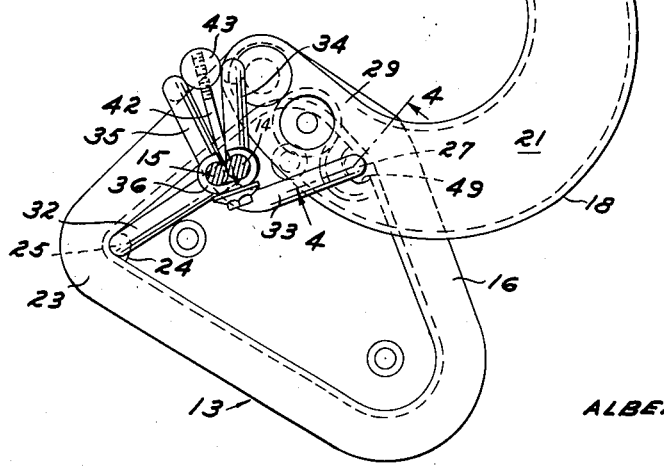
ALBERT J. HAMMOND
INVENTOR.
BY
J. R. Faulkner
J. J. Roethel
ATTORNEYS

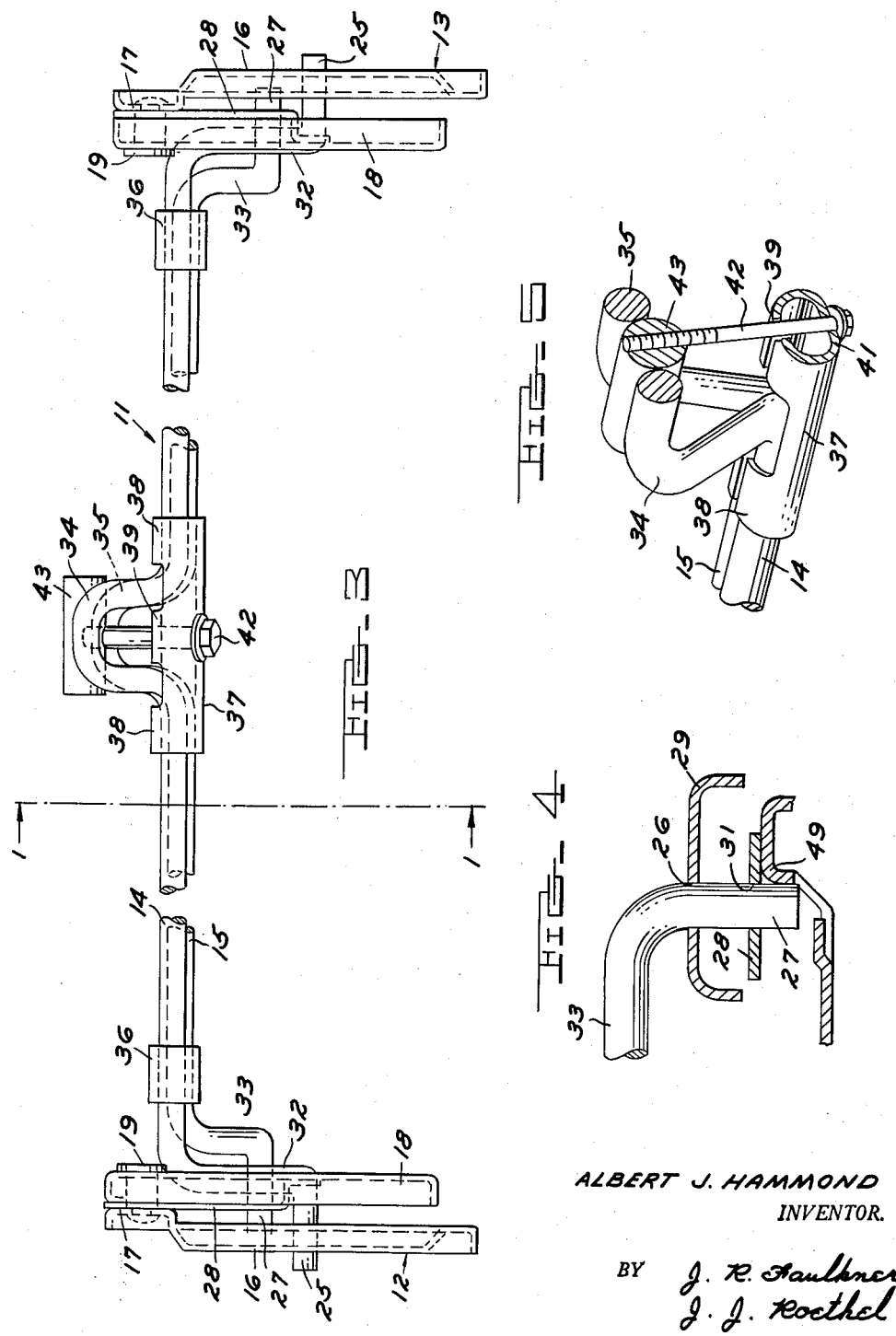

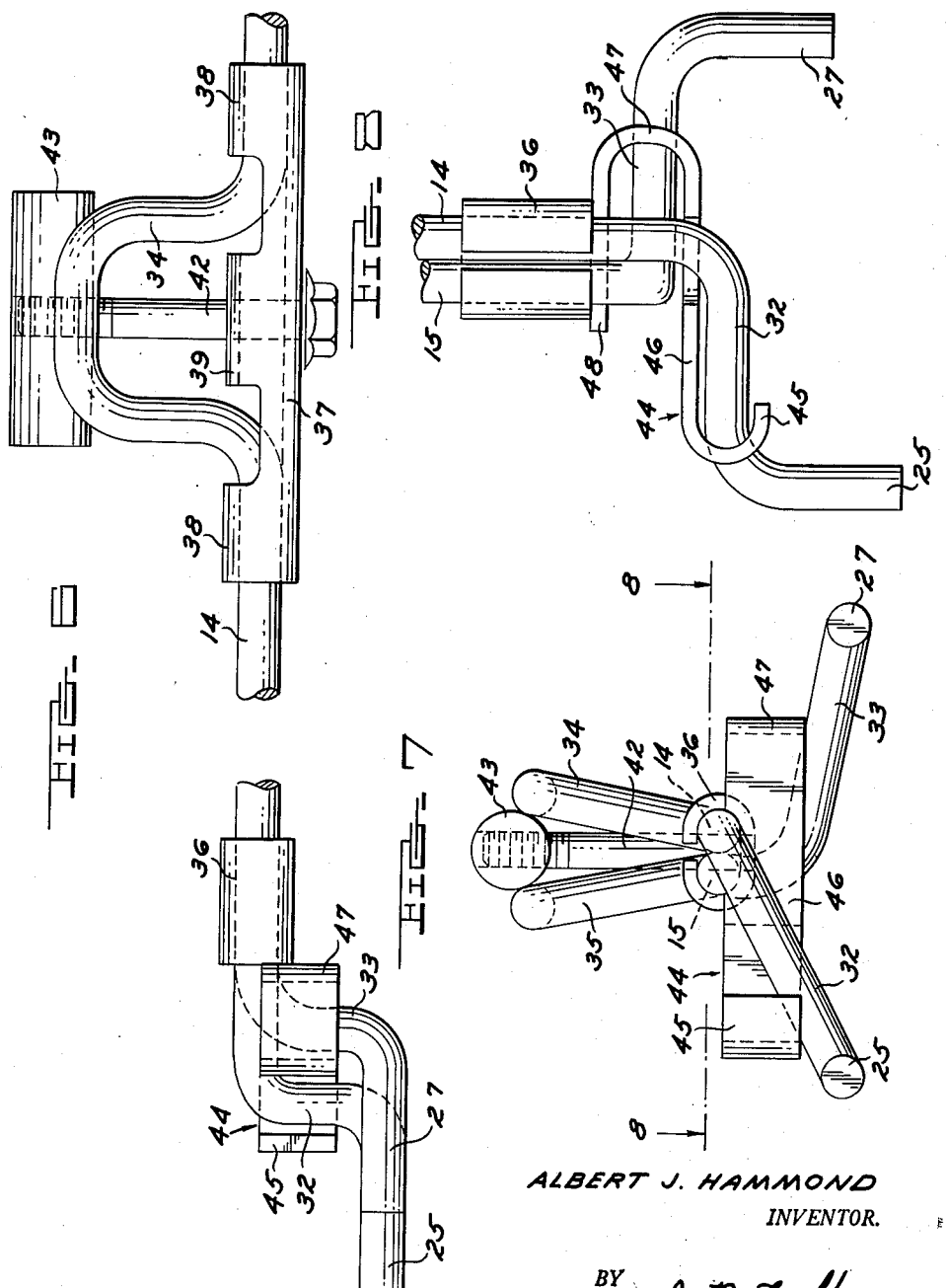

United States Patent Office 2,986,770
Patented June 6, 1961

2,986,770
TORSION ROD HINGE
Albert J. Hammond, Dearborn, Mich., assignor to Ford Motor Company, Dearborn, Mich., a corporation of Delaware
Filed May 19, 1960, Ser. No. 30,206
10 Claims. (Cl. 16—180)

This invention relates generally to hinge assemblies for automotive vehicles.

More particularly, the hinge assembly embodying the present invention is adapted to mount a closure structure, such as a deck lid, for swinging movement between opened and closed positions, the hinge assembly having incorporated therein torsion or torque rod counterbalance members operable to assist in the raising movement of the closure structure or deck lid and effective to maintain the closure structure or deck lid in raised position.

Hinge assemblies incorporating torsion or torque rod counterbalance devices have been found particularly adaptable for use in connection with the mounting of a rear closure structure or deck lid covering the luggage or storage compartments of passenger vehicles. Much of the utility of the storage compartment can be nullified by hinge device components which project too far into the compartment, such as is the case when large spiral or coiled springs are provided to act as a counterbalance means. Torsion or torque rods extending across the luggage compartment beneath the lip of the panel defining the luggage compartment opening occupy a relatively small amount of space and thus create little interference with the storage of luggage or other objects in the luggage compartment. Hinge structures embodying torsion rod counterbalance devices are, however, somewhat more difficult to install. For example, each deck lid generally is supported on two spaced hinges and the torsion or torque rods usually must be coupled to the hinges after they are in position. Provision is usually made for placing the torsion or torque rods under a preloaded condition so that they will function to counterbalance the weight of the deck lid structure. If the hinges are installed prior to the painting of the vehicle body, the preload on the torsion rods may be affected by the heat in drying the paint. It then becomes necessary to substantially disassemble the hinge assembly to provide for readjustment of the torsion or torque rod preload.

It is an object of the present invention to provide an improved torsion rod counterbalanced hinge assembly having the particular advantage that the torsion rods may be preloaded prior to assembly to the hinge devices and upon installation at the assembly line may be further adjusted by the simple manipulation of a tool. Further, should the hinge assembly installation be made prior to the painting of the body and should the preloaded setting of the hinge assembly be affected by the heat used in drying the paint, further adjustment may be made without requiring the torsion or torque rods to be disassembled from the hinge devices.

Other objects, advantages and features of the present invention will be made more apparent as the description proceeds, particularly when considered in connection with the accompanying drawings, wherein:

FIG. 1 is a sectional view taken substantially through the line 1—1 of FIG. 3 illustrating the hinge assembly as it appears in lowered or closed position of the closure structure or deck lid;

FIG. 2 is a view in part similar to FIG. 1 illustrating the hinge assembly when the closure structure or deck lid is in raised or opened position.

FIG. 3 is a plan view in part sectional illustrating the various elements of the complete hinge assembly for supporting a closure structure or deck lid in accordance with the present invention;

FIG. 4 is a sectional view taken substantially through the line 4—4 of FIG. 2 looking in the direction of the arrows;

FIG. 5 is an enlarged fragmentary perspective view in part sectional illustrating the adjustment means for the torsion bars;

FIG. 6 is an enlarged fragmentary view in part similar to FIG. 3 illustrating the torsion rods in preassembled condition prior to assembly to the hinge devices;

FIG. 7 is an end elevation of FIG. 6; and

FIG. 8 is a plan view of one end of the preassembled torsion rods looking in the direction of the arrows 8—8 of FIG. 7.

Referring now to the drawings, and particularly to FIGS. 1 and 3, there is illustrated the component structures of the hinge assembly embodying the present invention required to hingedly mount a deck lid or other closure structure (not shown) upon a vehicle body. The hinge assembly, generally designated 11 comprises three major components. It is provided with two symmetrically opposite hinge devices 12 and 13 and a counterbalance means in the form of the torsion or torque rods 14 and 15 extending across the width of the compartment between the hinge devices. The hinge devices 12 and 13 are adapted to be mounted on opposite side walls of a storage compartment.

Each hinge device 12 or 13 comprises a fixed hinge member in the form of a mounting plate or bracket 16 adapted to be bolted or otherwise secured to a side wall of the storage compartment. At its upper corner, as viewed in FIG. 1, each mounting plate 16 is provided with an embossed portion 17. A movable hinge member or gooseneck arm, generally designated 18, is pivotally connected to the mounting plate or bracket at the embossed portion 17 by means of a pivot stud or the like 19. The arm 18 is formed of a channel shaped cross section for structural reinforcement. Because it is mounted on the embossed portion of the mounting plate, the arm 18 is spaced from the mounting plate surface for swinging movement in a plane parallel to the plane of the latter. The arm 18 is provided with a gooseneck section 21 and a substantially straight section 22. The straight section 22 of the arm is adapted to be bolted, welded or otherwise secured to a web or reinforcing panel of the compartment closure lid (not shown) in a conventional manner.

At its lower left corner 23, as viewed in FIG. 1, the fixed hinge member or mounting plate 16 of the hinge device 13 is provided with an aperture 24 adapted to receive one end 25 of the torsion or torque rod 14. The movable hinge member or arm 18 is also provided with an aperture 26 to receive one end 27 of the torsion or torque rod 15. As best seen in FIG. 1, the aperture 26 is located a short distance below the pivotal axis of the movable hinge member or arm 18. A structural reinforcing plate 28 is welded or otherwise secured within the channel shaped upper portion 29 of the swingable or movable hinge member or arm 18, this structural member being provided with an aperture 31 in alignment with the arm aperture 26 through which the end 27 of the torsion rod 15 projects, see FIG. 4. It will be understood that the hinge device 12 is similarly connected or coupled to the torsion or torque rods 14 and 15.

As has been briefly referred to above, the counterbalance means forming a part of the present invention comprises a pair of torsion or torque rods 14 and 15 which extend between the two hinge devices 12 and 13. Each torsion or torque rod comprises an elongated member of circular cross section. The torsion rod 14 is provided at each of its ends with a crank portion 32 and the torsion rod 15 with crank portions 33. As best seen in FIG. 3, each crank portion 32 and 33 comprises a short section at substantially a right angle to the main elongated portion of the respective torsion rod. Each crank portion 32 of the torsion rod 14 terminates in a short extension or end portion, previously identified as 25, whose longitudinal axis substantially parallels that of the main elongated portion of the torsion rod 14. Similarly, each crank portion 33 terminates in the above-identified end portion 27. The rod 14 differs from the rod 15 in that it is slightly longer in length and in that its crank portions 32 are slightly longer than the crank portions 33. Substantially at its center each rod 14 and 15 is provided with a U-shaped section 34 and 35, respectively. In assembled relationship of the rods, the two U-shaped sections 34 and 35 are adapted to lie in opposed angular relationship to each other, as best seen in FIG. 7. It may also be noted with reference to FIG. 7 that the respective crank portions 32 and 33 of the rods 14 and 15 extend in opposite or crossed over direction relative to one another. The function of the U-shaped sections 34 and 35 and of the crossed over crank portions 32 and 33 will become apparent.

Before installation into the vehicle body, the torsion or torque rods 14 and 15 are preferably coupled or preassembled to each other. Three clip devices are used to hold the torsion rods in this subassembled relationship. At each end, just inwardly of the crank portions, a short clip 36 is wrapped around the rods after they are placed in abutting relationship to each other with their U-shaped sections extending upwardly and the crank portions in crossed over relationship, as shown in FIG. 7. The clips 36 comprise pieces of strap steel which are wrapped around the abutting rods. At the center, a more elaborate type clip 37 is used. The clip 37 is provided at each end with a wrap-around portion 38 adapted to encompass the two rods in their side by side relationship. The center section 39 of the clip 37 is provided with an aperture 41 extending through the walls thereof. The aperture 41 receives an elongated bolt 42 which extends upwardly between the two U-shaped sections of the torsion rods. The upper end of the bolt 42 is threaded through a cylindrical wedge member 43.

Prior to assembly of the torsion or torque rods into the vehicle, the crank portions are prepositioned and the torsion rods are preloaded. This is done through the use of temporary clips 44 which are provided for maintaining the torsion rods in preassembled or preadjusted position. As best seen in FIGS. 7 and 8, these clips 44 comprise substantially S-shaped straps of metal. It will be noted that the curved end 45 of each S-shaped strap or clip 44 is adapted to overlie the crank portion 32 of the torsion rod 14. The main body portion 46 of the strap 44 passes beneath the right angle bend between the crank portion 32 and the main body portion of the torsion rod 14. Each strap 44 is provided with a reverse bend portion 47 which overlies the crank section 33 of the other torsion rod 15. The reverse bend portion 47 of the strap terminates in a straight leg portion 48 adapted to underlie the two abutting torsion rods. One of the temporary straps 44 is used at each end of the preassembled torsion rods. It is believed readily apparent that if the wedge shaped member 43 is adjusted to spread the U-shaped sections 34 and 35 of the torsion rods 14 and 15, the crank portion 32 of the rod 14 will attempt to rotate in a clockwise direction as seen in FIG. 7 about the longitudinal axis of the rod and the crank portion 33 of the other torsion rod 15 will attempt to rotate in a counterclockwise direction about the longitudinal axis of the latter. After all slack is taken up, the straps 14 will prevent such rotation and thus place the torsion rods under a preload condition. The torsion rods may be preloaded prior to installation in the vehicle body to the extent necessary to support the deck lid or closure structure in its raised position.

After preassembly the rods 14 and 15 are carried to the assembly line for installation in the vehicle body to which the closure structure or deck lid previously has been attached by means of the hinge devices 12 and 13. With the deck lid held in a raised position, the end portions 25 and 27 of the torsion rods are inserted through the apertures 24 and 26 in the mounting plate 16 and swingable hinge arm 18, respectively, of each hinge device 12 and 13. It may be necessary to flex the torsion rod assembly to longitudinally shorten the distance between its ends so that the respective end portions may be inserted in the apertures of the hinge devices. Because of the length of the torsion rods, this can be easily done. It will be understood that when the assembly is completed, the temporary restraining straps 44 are displaced by simply depressing the deck lid or closure structure slightly. As soon as the force being exerted on each temporary restraining strap 44 is removed, the straps can be readily removed. Upon completion of this simple installation, the torsion rods are in position to effectively counterbalance the deck lid structure.

The counterbalancing effect may best be understood with reference to FIGS. 1 and 2. In FIG. 2 the torsion rods are shown as they appear when the swingable hinge members or arms 18, and therefore the closure structure or deck lid mounted thereon, are in their up or raised position. As the swingable arms 18 are swung in a clockwise direction about their pivot axes 19, the ends 27 of the torsion rod 15 are forced toward the ends 25 of the torsion rod 14. If the U-shaped center sections 34 and 35 were not present, each torsion rod would merely try to rotate about its longitudinal axis and no counterbalancing effect would be created. However, as the crank portions 33 are urged toward the crank portions 32, the U-shaped sections are also urged toward each other. But the U-shaped sections 34 and 35 are prevented from moving relatively toward each other by the wedge 43 therebetween. Thus, the rods 14 and 15 must twist about their longitudinal axes. As they twist, they store up energy resisting the force tending to twist them. The next time the deck lid latch mechanism is released, the two crank sections 32 and 33 will tend to move relatively away from each other as the torsion rods 14 and 15 untwist, and the deck lid swingable support arms will be swung upwardly in a counterclockwise direction about their pivot axes. The upward swinging movement of each arm is limited by a stop 49 formed in each mounting plate 16, the stop being merely an embossed portion engageable by the end of the torsion rod crank end portion 27 extending through the swingable member portion 29 and the reinforcing plate 28, as best seen in FIG. 4.

To briefly summarize the foregoing, the torsion rod 15 is operatively associated at each of its ends with a swingable member 18 of the hinge devices 12 and 13 and the other torsion rod 14 is fixed in a sense that its crank ends 25 are operatively associated with the fixed hinge member 16 of each hinge device 12 and 13. All of the counterbalance effort results from the fact that the two torsion rods 14 and 15 are tending to be twisted so that their opposed U-shaped sections 34 and 35 are rotated toward each other or toward the wedge 43 between them. Since the wedge 43 is unyielding, the rods 14 and 15 are placed under torsion.

It will be readily seen, that after the rods are positioned within the vehicle body and the counterbalance effect on the deck lide or closure structure is noted it becomes a simple matter to adjust to get exactly the desired counterbalance effect. This is done by merely applying a wrench to the head end of the bolt 42 threaded through the wedge 43, whereby the wedge may be raised or lowered as desired to increase or decrease the preload on the torsion rods. If the torsion rods are installed in the vehicle body prior to the painting of the body, and the heat used to dry the paint affects the initial setting of the torsion rods, it also becomes a simple matter to readjust the torsion of the rods by again applying a wrench to the head end of the bolt to move the wedge inwardly or outwardly as required.

It will be understood that the invention is not to be limited to the exact construction shown and described, but that various changes and modifications may be made without departing from the spirit and scope of the invention, as defined in the appended claims.

I claim:

1. A hinge assembly for mounting a closure on a vehicle body for swinging movement between open and closed positions, comprising a pair of spaced fixed hinge members secured to said body, a pair of movable hinge members each secured at one of its ends to said closure and pivoteted at its other end to a respective fixed hinge member, and a pair of torsion rods, one of said rods having a crank portion at each end thereof coupled to a fixed hinge member, the other of said rods having a crank portion at each end coupled to a movable hinge member, said torsion rods having opposing portions intermediate the ends thereof, said opposing portions reacting against each other as said crank portions coupled respectively to said fixed and movable hinge members are swung relatively toward each other to effect twisting of said torsion rods about their longitudinal axes as said closure is swung from an open to a closed position.

2. A hinge assembly for mounting a closure on a vehicle body for swinging movement between open and closed positions, comprising a pair of spaced hinge devices each having a fixed hinge member and a movable hinge member pivotally connected thereto, and a pair of torsion rods extending between said hinge devices, one of said rods at each of its ends having a crank portion coupled to a fixed hinge member, the other of said rods having at each of its ends a crank portion coupled to a movable hinge member, said torsion rods having opposing crank portions intermediate the ends thereof, said opposing crank portions reacting against each other to resist turning movement of said rods as the end crank portions are rotated as said closure is swung from an open to a closed position, said torsion rods thereby being torsionally twisted to yieldably resist such closing movement.

3. A hinge assembly for mounting a closure on a vehicle body for swinging movement between open and closed positions, comprising a pair of spaced hinge devices each having a fixed hinge member and a movable hinge member pivotally connected thereto, and a pair of torsion rods extending between said hinge devices, one of said rods at each of its ends having a crank portion coupled to a fixed hinge member, the other of said rods having at each of its ends a crank portion coupled to a movable hinge member, the adjacent end crank portions of said rods extending in crossed over relationship to each other, said torsion rods having opposing crank portions intermediate the ends thereof, said opposing crank portions reacting against each other to resist turning movement of said rods as the end crank portions are rotated relatively toward each other as said closure is swung from an open to a closed position, said torsion rods thereby being torsionally twisted to yieldably resist such closing movement.

4. A hinge assembly for mounting a closure on a vehicle body for swinging movement between open and closed positions, comprising a pair of spaced hinge devices each having a fixed hinge member and a movable hinge member pivotally connected thereto, and a pair of torsion rods extending between said hinge devices, one of said rods at each of its ends having a crank portion coupled to a fixed hinge member, the other of said rods having at each of its ends a crank portion coupled to a movable hinge member, the adjacent end crank portions of said rods extending in crossed over relationship to each other, said torsion rods having opposing crank portions intermediate the ends thereof, said opposing crank portions reacting against each other to resist turning movement of said rods as the end crank portions are rotated relatively toward each other as said closure is swung from an open to a closed position, said torsion rods thereby being torsionally twisted to yieldably resist such closing movement, and wedge means adjustably positionable between said opposing crank portions to preload said torsion rods.

5. A hinge assembly for mounting a closure on a vehicle body for swinging movement between open and closed positions, comprising a pair of spaced hinge devices each having a fixed hinge member and a movable hinge member pivotally connected thereto, and a pair of torsion rods extending between said hinge devices, one of said rods at each of its ends having a crank portion coupled to a fixed hinge member, the other of said rods having at each of its ends a crank portion coupled to a movable hinge member, said torsion rods having opposing crank portions intermediate the ends thereof, said opposing crank portions reacting against each other to resist turning movement of said rods as the end crank portions are rotated as said closure is swung from an open to a closed position, said torsion rods thereby being torsionally twisted to yieldably resist such closing movement, and wedge means adjustably positionable between said opposing crank portions to preload said torsion rods.

6. A hinge assembly for mounting a closure on a vehicle body for swinging movement between open and closed positions, comprising a pair of spaced hinge devices each having a fixed hinge member and a movable hinge member pivotally mounted thereon, and a pair of torsion rods extending between said hinge devices, retaining means positioning said torsion rods in longitudinally abutting relationship to each other, one of said torsion rods being coupled to each of said fixed hinge members and the other of said rods being coupled to each of said movable hinge members, each of said torsion rods having opposing portions intermediate the ends thereof, said opposing portions being constructed and arranged to resist turning movement of said torsion rods relative to one another as said movable hinge members are swung from closure open to closure closed position thereby placing said rods under closure counterbalancing torsion.

7. A hinge assembly for mounting a closure on a vehicle body for swinging movement between open and closed positions, comprising a pair of spaced hinge devices each having a fixed hinge member and a movable hinge member pivotally mounted thereon, and a pair of torsion rods extending between said hinge devices, retaining means positioning said torsion rods in longitudinally abutting relationship to each other, one of said torsion rods being coupled to each of said fixed hinge members and the other of said rods being coupled to each of said movable hinge members, each of said torsion rods having opposing portions intermediate the ends thereof, said opposing portions being constructed and arranged to resist turning movement of said torsion rods relative to one another as said movable hinge members are swung from closure open to closure closed position thereby placing said rods under closure counterbalancing torsion, and wedge means adjustably positionable between said opposing portions to pretwist said torsion rods.

8. A hinge assembly for mounting a closure on a vehicle body for swinging movement between open and closed positions, comprising a pair of spaced hinge devices each having a fixed hinge member and a movable hinge member pivotally mounted thereon, and a pair of torsion rods extending between said hinge devices, retaining means positioning said torsion rods in longitudinally abutting relationship to each other, one of said torsion rods being coupled to each of said fixed hinge members and supported solely thereby and the other of said rods being coupled to each of said movable hinge members and supported solely thereby, each of said torsion rods having opposing portions intermediate the ends thereof, said opposing portions being constructed and arranged to resist turning movement of said torsion rods relative to one another as said movable hinge members are swung from closure opened to closure closed position thereby placing said rods under closure counterbalancing torsion.

9. A hinge assembly for mounting a closure on a vehicle body for swinging movement between open and closed positions, comprising a pair of spaced hinge devices each having a fixed hinge member and a movable hinge member pivotally mounted thereon, and a pair of torsion rods extending between said hinge devices, retaining means positioning said torsion rods in longitudinally abutting relationship to each other, one of said torsion rods being coupled to each of said fixed hinge members and supported solely thereby and the other of said rods being coupled to each of said movable hinge members and supported solely thereby, each of said torsion rods having opposing portions intermediate the ends thereof, said opposing portions being constructed and arranged to resist turning movement of said torsion rods relative to one another as said movable hinge members are swung from closure open to closure closed position thereby placing said rods under closure counterbalancing torsion, and wedge means adjustably positionable between said opposing portions to pretwist said torsion rods.

10. Preassembled torsion rods comprising a pair of torsion rods, each rod having a laterally extending crank portion intermediate its ends and a crank portion at each end thereof, said end crank portions being angularly related to the intermediate crank portions, clip means encompassing said rods and retaining the same in longitudinal abutting relationship to each other with the intermediate crank portions opposing each other and the respective end crank portions in crossed over relationship to each other, wedge means positioned between said opposing crank portions, and removable clip devices extending over said crossed over end crank portions, said wedge means being positionable to urge said end crank portions against said removable clip devices by torsionally twisting said rods to hold the latter in preloaded preassembled condition.

References Cited in the file of this patent

UNITED STATES PATENTS

| | | |
|---|---|---|
| 2,799,891 | Ragsdale | July 23, 1957 |
| 2,871,505 | Clark et al. | Feb. 3, 1959 |
| 2,894,277 | Bogater et al. | July 14, 1959 |